United States Patent [19]

Van Cappellen et al.

[11] 3,944,644
[45] Mar. 16, 1976

[54] PROCESS FOR PRODUCING POLYMERIC FILM

[75] Inventors: Jan Baptist Van Cappellen, Berchem; Walter Johannes Rens, Kontich, both of Belgium

[73] Assignee: AGFA-Gevaert, Mortsel, Belgium

[22] Filed: Jan. 9, 1974

[21] Appl. No.: 432,034

[30] Foreign Application Priority Data
Jan. 10, 1973   United Kingdom ............... 1413/73

[52] U.S. Cl. ............. 264/146; 264/210 R; 264/216; 264/237; 264/289; 264/DIG. 73; 425/445; 425/DIG. 53
[51] Int. Cl.² ..................... B29C 25/00; B29D 7/24
[58] Field of Search ........ 264/146, 210 R, 288–289, 264/216, DIG. 73; 425/DIG. 53, 404, 445

[56] References Cited
UNITED STATES PATENTS
2,000,079   5/1935   Herndon ............................ 264/146

3,261,903   7/1966   Carr .................................. 264/289
3,816,886   6/1974   Van Cappellen ................... 264/288

*Primary Examiner*—Robert F. White
*Assistant Examiner*—Gene Auville
*Attorney, Agent, or Firm*—William J. Daniel

[57]   ABSTRACT

Polymeric film is stretched by pulling the film over a first roller which is heated and over a second roller which is cooled, the second roller rotating at a greater peripheral speed than the first roller. The necking-in of the film in the gap between the two rollers is considerably reduced if a heat-transfer liquid is applied between marginal portions only of the film and the corresponding peripheral portions of the second, cooled, roller.

9 Claims, 3 Drawing Figures

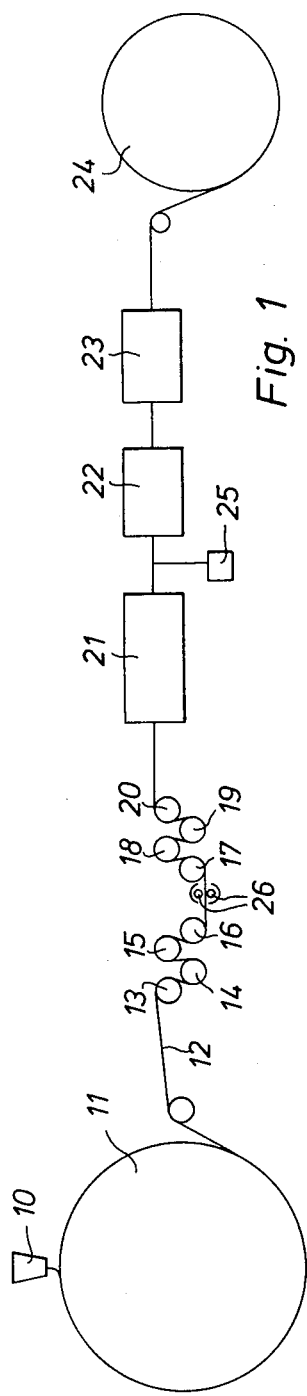
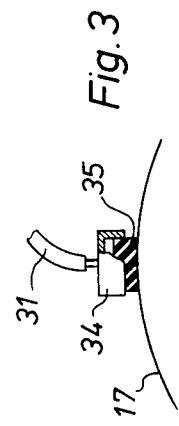
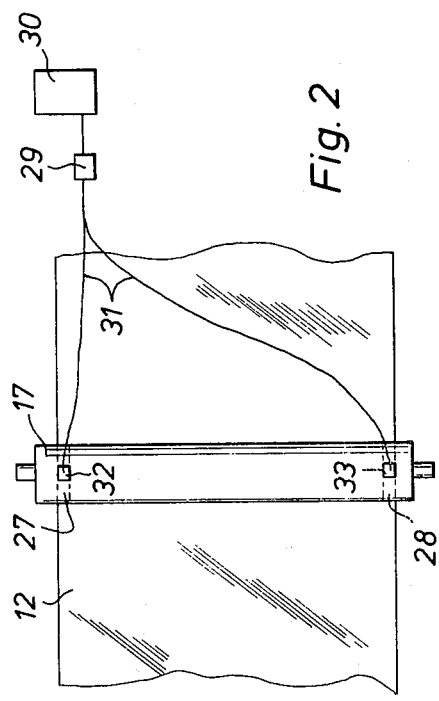

PROCESS FOR PRODUCING POLYMERIC FILM

The present invention relates to a process and apparatus for producing polymeric film, wherein a polymeric film which has been heated to a temperature at which it is readily deformable, is longitudinally stretched.

In the manufacture of polymeric film, a molten thermoplastic polymer, e.g. a polyester such as polyethyleneterephthalate, is extruded through an elongated narrow extrusion orifice to form a molten film. The molten film is quenched, which means sufficiently rapidly cooled to obtain a solidified film the structure of which is still amorphous. By stretching the quenched film longitudinally or both longitudinally and laterally while the polymer is at the lower end of the softening range, somewhat above the glass transition temperature, the polymer may be subjected to molecular orientation leading to an improvement in various physical properties of the film, notably its tensile strength. The longitudinal and lateral stretching operations are usually carried out in succession, the film being usually stretched first in the longitudinal and then in the lateral direction.

The longitudinal stretching of the film is usually done in the gap between two rollers over which the film is pulled, the first roller being heated and being rotated at a first speed, and the second roller being cooled and being rotated at a second speed which is higher than the speed of the first roller. The film may be subjected to infrared radiation in the gap between the two rollers in order to sufficiently weaken it for ready stretching. In order to effect the lateral stretching of the film, the edges of the longitudinally stretched film are gripped in clamps which are made to follow diverging paths so that the lateral dimension of the film may be increased by a factor up to say 3.5.

The application of longitudinal tension upon the film during the longitudinal stretching causes the film to "neck-in" and as a result of lateral forces acting on the film, the film slips laterally and unevenly upon the surface of the roller, or the first of a series of rollers, which exert the longitudinally pull on the film. As a consequence thereof, the film entering the lateral stretching mechanism is of varying width and in consequence it may repeatedly occur that portions along the film edges are not gripped or are gripped to an insufficient extent by the clamps of the stretching mechanism so that upon laterally stretching the film the stretching forces are not properly distributed. If the film edges are released by even one clamp due to it not having properly gripped the film edge, a complete rupture of the film in the course of the lateral stretching may occur so that the manufacturing process must be interrupted in order to re-introduce the film into the lateral stretching mechanism.

In addition, the irregular necking-in of the film requires the adjustment of a number of other devices which are involved in the production process, such as coating devices, edge trimming devices, etc., to cover a width which corresponds with the minimum film width which can be expected so that considerable production losses result in consequence. The irregular necking-in is therefore a disadvantage even if the film is not subsequently subjected to transverse stretching.

The present invention aims at providing an improved process wherein the rate and variations of the necking-in of film which is being longitudinally stretched are avoided or considerably reduced.

According to the present invention, there is provided a process for producing polymeric film, wherein a polymeric film, while it is at a temperature at which it is readily deformable, is longitudinally stretched in a zone where the film is unsupported by drawing the film away from said zone at a speed which is greater than the speed at which the film is fed into such zone, and wherein a heat-transfer liquid is provided between the film and a cooling roller onto which the film is received at the end of its travel through said zone, the process being characterized in that the heat-transfer liquid is supplied between marginal portions only of the film and the corresponding peripheral portions of said cooling roller, thereby to reduce and stabilize the necking-in of the film on said cooling roller.

The invention is at present considered to be particularly advantageous for manufacturing thin polymeric film having a thickness less than 0.5 mm, but the invention is not confined to processes and apparatus for producing films of such small thickness. The present effect of the application of a heat-transfer liquid between margins of the films and the cooling roller is quite surprising, because it is known that the application of a liquid between a film and a cooling surface over the full width of the film increases the necking-in of a film, rather than reducing it.

In United Kingdom Pat. Specification 1,140,175 filed Mar. 22, 1967 by Kodak C° a method of producing thermoplastic sheeting has been disclosed, comprising including a film of a liquid heat transfer medium between an extruded curtain of fluid thermoplastic material and a cooled carrying surface, whereas in French Pat. Specification 2,049,046 filed July 22, 1970 by du Pont de Nemours it is said that a layer of liquid between an extruded polymeric film and a cooling surface forms a floating transition between the film and the cooling surface so that necking-in and thickness variations of the film increase and it is therefore proposed to electrostatically attract the film to the cooling surface in order to reduce the described adverse effect of the liquid layer.

The optimum width of the marginal portions over which liquid is applied can be easily determined by tests. In general the width of each of such marginal portions will be below 7.5 % of the width of the film measured at the site of the said cooling roller.

Extruded polymeric film usually has margins or edges of substantially greater thickness than the main part of the film width and for many purposes, and notably in the manufacture of photographic film support, it is necessary to trim off such margins or edges. According to a preferred embodiment of the present invention, margins of the film are trimmed off subsequent to the said longitudinal stretching operation and the width of the marginal zones over which the said liquid is supplied does not exceed one and a half times the width (measured at the site of the said cooling roller) of those marginal portions of the film which are subsequently trimmed from the film before the film is wound up. The term "edge loss" is used in the art to denote the amount of the film which is removed from the film margins in the course of the production process for one reason or another such as excessive thickness of the film margins in comparison with the thickness of the central portion of the film, wrinkling of the margins, different crystallinity, etc. When trimming a film produced according to the invention, the width of the film margins trimmed off may be equal to the width of the marginal zones to which liquid is supplied as aforesaid. Of course the trimmed width may if desired be somewhat greater than the width of the said zones. This latter situation will usually occur if the film is laterally (transversely) stretched after the longitudinal stretching.

An apparatus for use in producing polymeric film in accordance with the present invention comprises a rotatable cooling roller for cooling the film as the film is at a temperature which is higher than its glass-transition temperature, and means for supplying a heat-transfer liquid between marginal portions only of the film and the corresponding peripheral portions of said cooling roller.

According to a preferred embodiment of the invention, the apparatus comprises two applicators with pads which are mounted for rubbing contact with peripheral portions of the cooling roller that correspond with the location of the marginal portions of the film on said roller, and a supply of heat-transfer liquid which is in connection with said applicators via metering means which controls the rate of flow of said liquid to said applicators.

The invention will hereinafter be described by way of example with reference to the accompanying drawings in which:

FIG. 1 is a diagrammatic representation of a film extrusion apparatus.

FIG. 2 is a diagrammatic elevation of the cooling surface of the apparatus according to FIG. 1 wherein the application of a liquid for improvement of the adherent contact between the film and the cooling surface is illustrated.

FIG. 3 is a detailed illustration of an applicator for the liquid.

Referring to FIG. 1, a molten polymer is extruded through an extrusion die 10 onto a quenching drum 11 on which the film is cooled to a temperature below the glass transition temperature of the polymer. The cooled film 12 is thereafter heated by passing it over heated rollers 13 and 16 which are driven at equal speeds and which raise the temperature of the film to a value slightly below the temperature of longitudinal stretching. The film is longitudinally stretched in the gap between the roller 16 and the roller 17 of the set of rapidly rotating cooled rollers 17 to 20. The film is weakened in said gap by heating it to a temperature slightly above (preferably between 10° and 30°C above) its glass transition temperature by infrared rod heaters 26, and the longitudinal stretching of the film actually occurs over a distance comprised between said infrared heaters and the line of first contact of the film with the first cooled roller 17.

The film is then introduced into a lateral stretching device 21 which comprises, as known in the art, two endless chain mechanisms one at each edge of the film, which drive a great number of film clamps. The film clamps are supported and guided by rails which follow diverging paths so that the film edges which have been gripped by the clamps at the entry of the stretching device are progressively moved further away from each other as they move towards the exit of the device.

The film leaving the lateral stretching device 21 may undergo further treatments to improve its mechanical properties and its dimensional stability, such as heat-setting in a station 22 and heat-relaxing in a station 23. The film is finally wound to a roll 24. The edges of the film which have been deformed as a consequence of surface tension effects, of non-uniform stretching during the lateral stretching, etc., are trimmed at a station 25 disposed after the lateral stretching device 21.

During the longitudinal stretching of the film, the film tends to slip laterally and unevenly on the surface of the roller 17. As a consequence thereof, the width of the film leaving the longitudinal stretching device is locally reduced, and if such reduction in width becomes too markedly, the edges of the film are no longer gripped, or are gripped to an insufficient extent only, by the clamps of the lateral stretching device 21.

Practice shows that failure of even one clamp only to grip a film edge as the film enters the device, or slipping of a clamp from a film edge upon lateral stretching of the film, inevitably cause transverse rupture of the film before the concerned film portion leaves the lateral stretching device.

In accordance with the present invention the film width is held constant by the supply of a heat-transfer liquid to zones between marginal portions of the film and the roller 17, which roller has a mirror-like surface finish.

The application of the liquid is illustrated in FIG. 2, wherein applicators 32 and 33 moisten bands 27 and 28 on the periphery of roller 17. This moistening occurs by means of a metering pump 29 which feeds liquid from a container 30 through flexible conduits 31 to the applicators 32 and 33. The applicators comprise a square metal housing 34, see FIG. 3, open at the lower end and provided at the upper end with a connection for a flexible conduit 31. A piece of felt 35 is clamped in the opening at the lower side of the applicator housing and resiliently contacts the peripheral surface of the roller 17 over a band, the limits of which have been indicated by the broken lines in FIG. 2. The applicators are provided with a bracket, not shown, by means of which they are fitted to a rod which extends parallel to the roller 17. The brackets may slide over the rod and their position may be fixed by means of an appropriate locking mechanism so that the lateral position of the bands 27 and 28 on the roller 17 may be easily and accurately adjusted to correspond with the margins of the film 12 pulled over said roller.

The following example illustrates the present invention.

A polyethylene terephthalate polymer having an inherent viscosity of 0.59 and a specific density of 1.33 g.cm$^{-3}$ is extruded at a rate of 580 kgh$^{-1}$ and at a temperature of 285°C through a conventional flat extrusion die having an orifice measuring 480 mm by 2.4 mm. The molten polymer is received on the quenching drum 11 which is rotated at a rate of 6.7 m.min$^{-1}$ and is maintained at a temperature of about 16°C. The film is passed over rollers 13 to 16 heated to a temperature of 80°C and rotating at a rate of 6.7 m.min$^{-1}$, and subsequently the film is weakened by heating by the infrared heaters 26 to a temperature slightly above its glass-transition temperature, for instance a temperature between 85° and 110°C, the glass-transition temperature of the polymer being 79°C. The film is then passed over rollers 17 to 20 having a temperature of 30°C and rotating at a rate of 25.6 m.min$^{-1}$ causing a longitudinal stretch ratio for the film of 3.8.

The width of the film leaving roller 16 amounts to 455 mm and the width of the film entering the lateral stretching device 21 varies between 410 and 400 mm.

The extrusion operation is repeated, except for the fact that the container 30 is filled with glycol which is pumped at a rate of 6 ml.H$^{-1}$ to the applicators 32 and 33 which moisten the roller 17 over bands 27 and 28 having a width of 10 mm each. It is found that under these circumstances the width of the film entering the lateral stretching device amounts to 410 mm and that variations in the width of the film do not exceed 1 mm.

The extrusion apparatus wherein glycol was applied between the film and the cooling surface operated for many months without any rupturing of the film in the lateral stretcher. On the contrary, in the apparatus operating without glycol application, there were weekly two to three ruptures of the film.

In the introduction of the present invention, it was already mentioned that the favorable effect of the application of a heat-transfer liquid in accordance with the present invention is quite surprising, considering the prior art teaching. In an attempt to further examine the particular behaviour of the necking-in of the film, glycol was supplied to the roller 17 over the full width of the film and at a layer thickness corresponding with that of the liquid layers at the bands 27 and 28. It was found that the width of the film entering the lateral stretching device after such uniform wetting was considerably smaller than 400 mm, and that the edge loss increased by a factor greater than 3.

It will be understood that the invention is not limited to the described embodiment.

Liquids other than glycol may be used for improving the heat-transfer between the film and the rapidly rotating cooling roller. Such liquids are, for instance alcohols, diglycols, hydrocarbon oils, and combinations thereof.

The applicators 32 and 33 may apply the liquid directly to the margins of the film, rather than to peripheral bands on the cooling roller as described. Furthermore, the application of the liquid, whether onto the film or onto the roller, may occur by spraying, by condensation, by transfer from an additional roller dipping in a tray containing the liquid, etc.

The application of a liquid between a rapidly rotating cooling roller and the margins of a film passed over such cooling surface may occur at other stages in the extrusion process than at the one described. Thus, the liquid may also be applied between the quenching drum 11 and the margins of an extruded molten film curtain in order to reduce and to stabilize the necking-in of the film in the gap between the extrusion orifice and the quenching surface in the event that the film is stretched in said gap. The term "roller" where used in the claims of this specification is accordingly to be construed to include a drum.

The width of the bands 27 and 28 was choosen in the described example in such a way that it corresponded with the width of the film margins which, after orientation of the film in the lateral stretching device 16, were trimmed off at the station 25. It will be apparent that the bands 27 and 28 may also cover portions of the film which are narrower than the film margins which are trimmed. If the liquid is applied at zones which are wider than the film margins to be trimmed off at a later stage, it is desirable to select a liquid which does neither attack the film surface nor interfere with operations, such as coating, which are carried out after the improvement of the adherent contact of the margins of the film, since then the trimming of the margins of the film will not completely remove the attacked or the affected portions of the film.

Finally, the process of the present invention is suitable for use in the production of film from polymers other than polyethylene terephthalate which lend themselves to longitudinal stretching. Some of these polymers are polyvinylidene chloride and copolymers thereof, polyamides, polystyrene and its copolymers, polycarbonates, etc.

We claim:

1. In a process for producing polymeric film, wherein a polymeric film, while it is at a temperature at which it is readily deformable, is longitudinally stretched in a zone where the film is unsupported by drawing the film away from said zone at a speed which is greater than the speed at which the film is fed into such zone, the improvement of supplying a heat-transfer liquid between the film and a cooling roller onto which the film is recieved at the end of its travel through said zone, and wherein the heat-transfer liquid is supplied between marginal portions only of the film and the corresponding peripheral portions of said cooling roller thereby to reduce and stabilise the necking-in of the film on said cooling roller.

2. A process according to claim 1, wherein the film is longitudinally stretched while it is at a temperature between 10° and 30°C above its glass-transition temperature.

3. A process according to claim 1, wherein margins of the film are trimmed off as "edge loss" subsequent to said longitudinal stretching operation and wherein the width of the zones over which said liquid is supplied does not exceed one and a half times the width (measured at the site of the said cooling roller) of those marginal portions of the film which are subsequently trimmed off.

4. A process according to claim 3, wherein the width of said zones over which liquid is supplied does not exceed the width (measured or the site of said cooling roller) of those marginal portions of the film which are subsequently trimmed off.

5. A process according to claim 1, wherein said liquid is applied to the cooling roller.

6. A process according to claim 5, wherein the application of said liquid occurs by sliding contact of a resilient material saturated with said liquid, with the cooling roller.

7. A process according to claim 1, wherein said liquid is glycol.

8. A process according to claim 1, wherein the film is laterally stretched after its longitudinal stretching.

9. A process according to claim 1, wherein said polymeric film is a polyethylene terephthalate film.

* * * * *

UNITED STATES PATENT AND TRADEMARK OFFICE
CERTIFICATE OF CORRECTION

PATENT NO. : 3,944,644
DATED : March 16, 1976
INVENTOR(S) : Jan Baptist Van Cappellen et al It is certified that error appears in the above-identified patent and that said Letters Patent are hereby corrected as shown below:

In the Heading:

Item [73] Assignee, should read -- AGFA-GEVAERT N.V. --.

Item [30] Foreign Application Priority Data, should read

-- Jan. 10, 1973          United Kingdom...........1413/73

Nov. 6, 1973          United Kingdom................1413/73

Signed and Sealed this

Eighth Day of March 1977

[SEAL]

Attest:

RUTH C. MASON
*Attesting Officer*

C. MARSHALL DANN
*Commissioner of Patents and Trademarks*